United States Patent [19]

Johannessen

[11] 4,423,419
[45] Dec. 27, 1983

[54] PULSED, PSEUDO RANDOM POSITION FIXING RADIO NAVIGATION METHOD AND SYSTEM AND THE LIKE

[75] Inventor: Paul R. Johannessen, Lexington, Mass.

[73] Assignee: Megapulse Incorporated, Lexington, Mass.

[21] Appl. No.: 198,547

[22] Filed: Oct. 20, 1980

[51] Int. Cl.³ .............................................. G01S 1/24
[52] U.S. Cl. .................................. 343/387; 364/452; 455/65; 343/378
[58] Field of Search .................. 343/103; 364/452; 375/1, 58, 101; 455/65

[56] References Cited

U.S. PATENT DOCUMENTS

| | | | |
|---|---|---|---|
| 3,378,847 | 4/1968 | Grover et al. | 343/103 |
| 3,711,725 | 1/1973 | Johannessen | 307/108 |
| 3,786,334 | 1/1974 | Johannessen | 321/45 |
| 3,882,504 | 5/1975 | Currie et al. | 343/103 |
| 3,889,263 | 6/1975 | Johannessen | 343/103 |
| 3,921,076 | 11/1975 | Currie | 325/321 |
| 4,104,635 | 8/1978 | Brodeur | 343/103 |
| 4,150,380 | 4/1979 | Brodeur | 343/103 |
| 4,151,528 | 4/1979 | Johannessen | 343/103 |
| 4,161,696 | 7/1979 | Dishal et al. | 343/103 X |
| 4,291,410 | 9/1981 | Caples et al. | 375/98 |
| 4,334,314 | 6/1982 | Nard et al. | 455/65 |

OTHER PUBLICATIONS

R. C. Dixon, *Spread Spectrum Systems,* John Wiley and Sons, 1976, pp. 61-64, 85-91.

Megapulse Inc., "Accufix Instruction Manual", Bedford, Massachusetts, 1973-1974, pp. 2-57 to 2-62, 2-82 to 2-101.

*Primary Examiner*—Theodore M. Blum
*Attorney, Agent, or Firm*—Rines and Rines, Shapiro and Shapiro

[57] ABSTRACT

This disclosure is concerned with a technique and apparatus for reducing CW and other inband interference in a broad bandwidth RF pulse navigation system to inobtrusive noise through the use of pulse-position random modulation, including, where desired, superimposed random phase modulation, with signal-random modulation code cross-correlation in reception.

29 Claims, 12 Drawing Figures

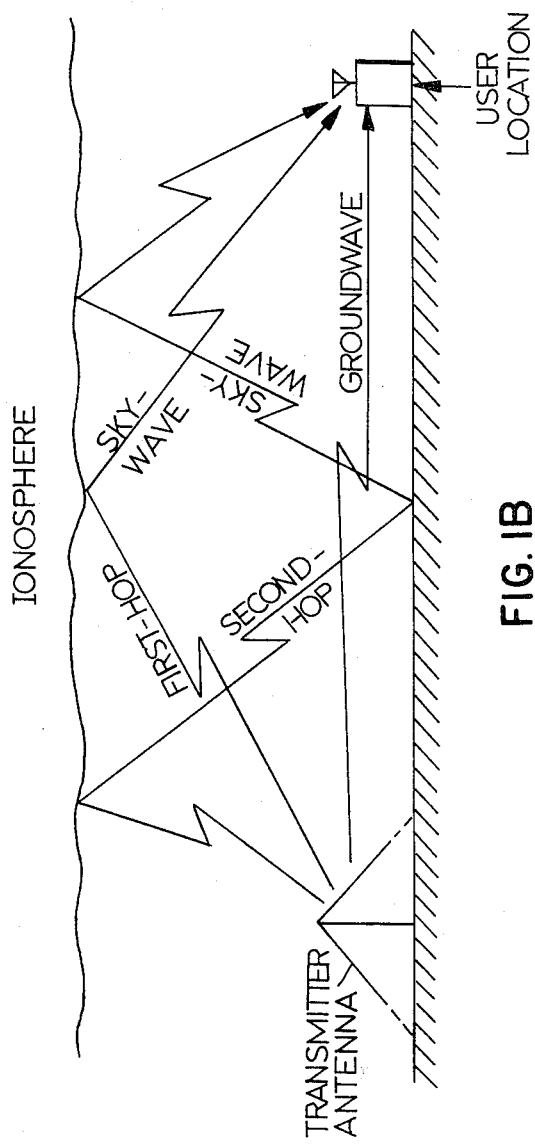
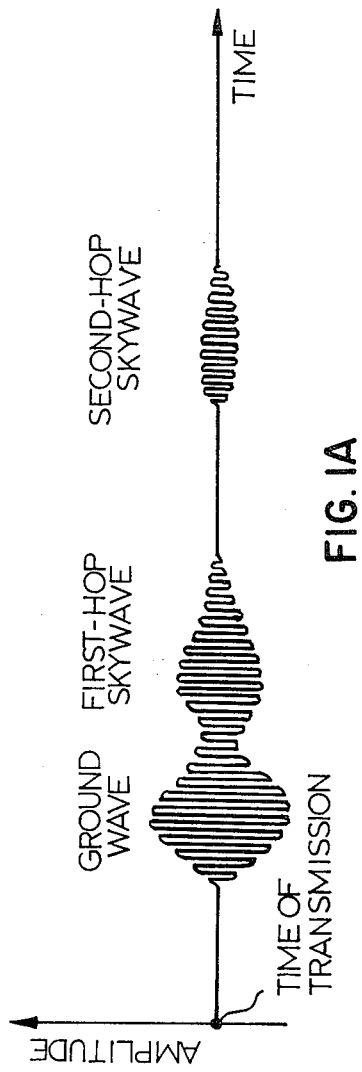
FIG. 1B
FIG. 1A

PULSED, PSEUDO RANDOM POSITION FIXING RADIO NAVIGATION METHOD AND SYSTEM AND THE LIKE

The present invention relates to navigation or position fixing systems and methods relying upon particular propagation characteristics of electromagnetic waves, as in the radio frequency (RF) spectrum; being more particularly though not entirely concerned with such systems as Loran, Omega, Decca, GPS, etc., wherein the positional accuracy attained depends upon the stability of the velocity of propagation of the electromagnetic waves.

Such systems use two or more transmitting stations, either transmitting continuous wave (CW) RF signals at different frequencies for purposes of identifying the different stations, or pulsed RF signals with different code formats for purposes of identifying the different stations. If only two stations are employed, as an illustration, position fixing may be obtained by determining the range to each station from the user location. The intersection of two range circles, for example, around respective stations, will define the location of the user; such systems often being referred to as range-range position fixing systems. To determine these ranges, the user must know the relative location of the stations, the exact time of day, and the time of transmission from the two stations; and with such knowledge, and measuring the times of arrival of the transmitted waves, the user can calculate the ranges to the transmitting stations. A cesium clock or other standard is currently usually employed by the user to keep track of the exact time of the day (to better than 100 nsec). When three and more stations are used, these stations are synchronized in time, and the user selects one station as a reference, often referred to as the master station; and measures the time difference of arrival of signals from the other stations with respect to the master station. Lines of constant time difference between the master station and another, form hyperbolae; and these types of position fixing systems are often referred to as hyperbolic navigation systems of which Loran is an important example.

As previously mentioned, the position accuracy of such systems depends upon the constancy of the velocity of propagation of electromagnetic waves, with the carrier frequencies used in these systems covering the range from very low frequencies (VLF) to ultra high frequencies (UHF). The propagation characteristics of electromagnetic waves, however, vary widely over this tremendous frequency range. At the low frequency range, such as employed in the Omega system, the carrier frequency of which is approximately 10,000 Hz, the surface of the earth and the ionosphere form a wave guide that determines the propagation characteristics of these radio waves. The velocity of propagation of the waves guided by the earth and the ionosphere is a function of the effective height of the ionosphere above the earth. The effective height of the ionosphere varies considerably from night to day and from season to season since it is affected by solar radiation; and periods of sun flares also greatly influence the effective height of the ionosphere. Large unpredictable errors in position fixing (as much as 6 nautical miles) can thus result from the solar perturbations of the ionosphere.

Similarly, the navigation system Loran-C is affected by the ionosphere. This system operates at a carrier frequency of 100 kHz, at which frequency the ray theory is usually applicable to explain the propagation characteristics of the radio waves. Loran-C transmissions consist of RF pulses of a tearshaped form, as described, for example, in my earlier U.S. Pat. Nos. 3,889,263; 3,786,334 and 3,711,725, with appropriate user receivers for enabling reception thereof being described, for example, in U.S. Pat. Nos. 3,882,504 and 3,921,076. The RF pulse emitted from the Loran antenna travels to and is received by the user by means of a ground wave, a first-hop skywave singly bounced from the ionosphere, a second-hop skywave reflected from two locations of the ionosphere, and so on, as illustrated in connection with hereinafter described FIGS. 1A and 1B hereof. Since the height of the ionosphere depends upon solar radiation, the times-of-arrival of the skywaves are unpredictable. The ground wave, however, is stable and this wave may therefore be used for position determination by the user. Only the first few RF cycles in the ground wave are used for position determination, as explained, for example, in the above-mentioned receiver patents, in order to insure that the first-hop skywave does not interfere. The higher-order-hop skywaves, however, may overlap succeeding transmitted pulses and thereby none-the-less cause interference.

This interference is avoided by a special signal format, as shown in later-described FIGS. 2(A) and (B), the code of which is selected to avoid correlation of the delayed sky-wave signals with the ground wave signal. As later more fully explained, tight tolerances are thus imposed upon the front-end filtering and processing circuits of the receiver channels to insure that each received signal is identically processed and that the time delay for each is precisely the same—the filter tolerance requirements being thus extremely strict and difficult to meet with relatively inexpensive components.

An object of the present invention, accordingly, is to provide a new and improved method of and apparatus for eliminating this long-standing problem of tight component tolerances in the RF front end of such navigation receivers.

Another serious problem with present systems is their susceptibility to interference from in-band transmissions from other stations, such as low-frequency military transmissions and medium-frequency broadcast transmissions. Mutual intereference between navigation systems also exists, moreover, such as between DECCA Navigator and Loran-C. The reverse problem in which the navigation system interferes with broadcasting systems, both civil and military, also exists. A further objective of this invention, therefore, is to minimize such mutual interference, thereby permitting navigation and communication systems to co-exist in the same frequency band without degradation of performance.

An additional object is to provide a novel technique and apparatus involving random pulse position coding and also random phase modulation, where desired, to obviate such interference and related problems, as in Loran-type and other signal transmission systems, as well. The use of such coding in the short pulse system is different from GPC where biphase coding alone is used to increase ranging accuracy and provide code division (as opposed to time division) signal multiplexing.

Other and further objects will be explained hereinafter and are more fully delineated in the appended claims. In summary, however, from one of its important aspects, the invention embraces a method of rendering multi-station radio frequency pulse navigation relatively insensitive to inband interference, that comprises, transmitting groups of radio-frequency pulses from each station with a group repetition rate selected to enable transmission of a pulse group from each station with sufficient time between each pulse group that signals from two or more of the stations cannot overlap in time anywhere in the navigation coverage area; randomly pulse-position modulating pulses within groups in accordance with a predetermined code and over a sufficiently large number of groups to insure that the random sequence contains a sufficiently large number of pulses that adequate skywave-groundwave rejection of the transmitted pulse groups occurs everywhere the same are received in said navigation coverage area. Preferred details and best mode applications are later presented.

The invention will now be described with reference to the accompanying drawings, FIGS. 1(A) and (B) of which repectively illustrate multi-signal reception paths from Loran-C navigation transmitters to user receivers and the received signal waveforms;

FIGS. 2(A) and (B) respectively show a Loran-C transmitted eight-pulse group and code format for the transmitters;

FIG. 3 shows a preferred radiated pulse waveform for a best-mode application of the type described in my U.S. Pat. No. 4,151,528, issued Apr. 24, 1979;

Figure 2A:
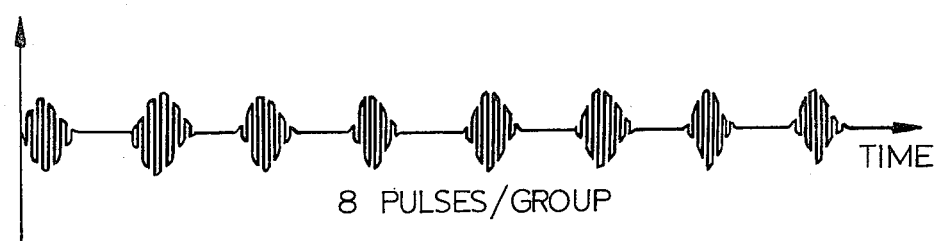

Turning, first, to an example of the seriousness of the previously described strict filtering tolerances in navigation receivers, consider the Loran-C technology. As before mentioned, the special signal format selected to avoid overlap of higher-order-hop skywave signals with the ground wave signals is currently a format involving the transmission by each Loran-C station of groups of eight pulses spaced one millisecond apart; FIG. 2(A). These groups of pulses are transmitted at a fixed repetition rate and they are phase-coded in accordance to the sequence of plus and minus signs shown, for example, in the XMTR 1 box of FIG. 2(B). A "plus" sign indicates a pulse of zero degree carrier phase, and a "minus" sign indicates a pulse of 180° carrier phase. The code is selected, as previously stated, such that delayed skywaves are uncorrelated with the ground wave.

Figure 2B:
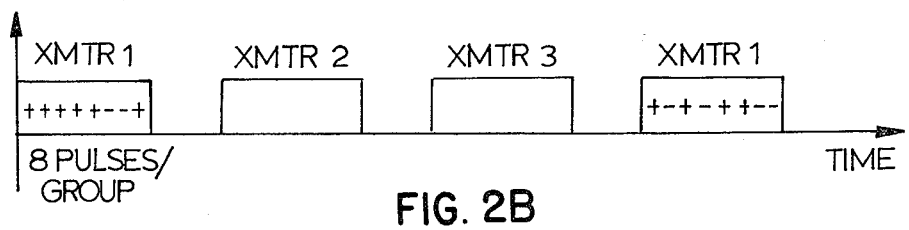

The other transmitters in the chain (XMTR2 and XMTR3, FIG. 2(B)) transmit their signals in the allocated spaces shown, and the group repetition rate is selected such that it contains time for transmission of the pulse group from each station and sufficient time between each pulse group so that signals from two or more stations cannot overlap in time anywhere in their coverage area. Thus, the transmitted signals are time shared so that all signals pass through the same front end of the receivers. Since the position determination is based on the time difference measurement (difference in time-of-arrival of the electromagnetic waves from the transmitting stations), it is important, as before mentioned, that each received signal is processed in an identical manner so that the time delay in the front end of the receiver is the same for all signals.

In CW hyperbolic navigation systems such as DECCA Navigator and Omega, on the other hand, parallel channels are used in the receiver, each channel receiving a particular transmitted signal. The time delay in each of these channels must be almost identical over a wide dynamic signal range. Receivers of this type are quite expensive. As an example of the degree of stability required, consider the DECCA Lambda system wherein a receiver front-end bandwidth of 15 Hz is used. Assuming that the filter therein employed is first order, then the signal delay is 0.01 seconds, which corresponds to a distance of 3180 km. A receiver front end error of 10 nsec. is introduced if the bandwidths of the receiving channel differ by only 0.000390%. Thus, the tolerances of the filter components must be of the same order of magnitude; and only with temperature-controlled crystal filters is it possible even to approach this kind of stability. Even with a receiver front-end bandwidth of 15 kHz, as in Loran-C receivers, the tolerance requirements on filter components are difficult to meet.

In addition to the important interference problem, the technique of the invention relaxes these receiver tolerance requirements and simplifies the required equipment.

Figure 3:
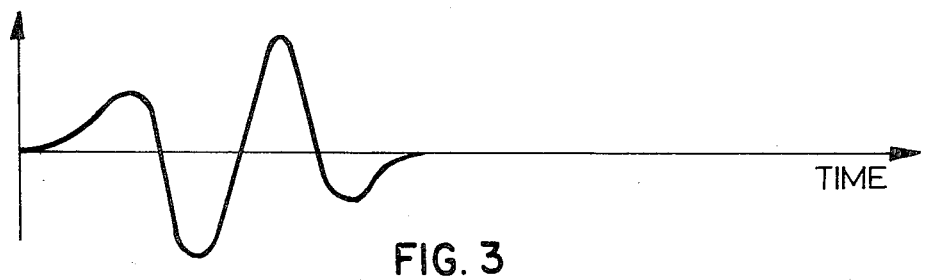
Figure 4:
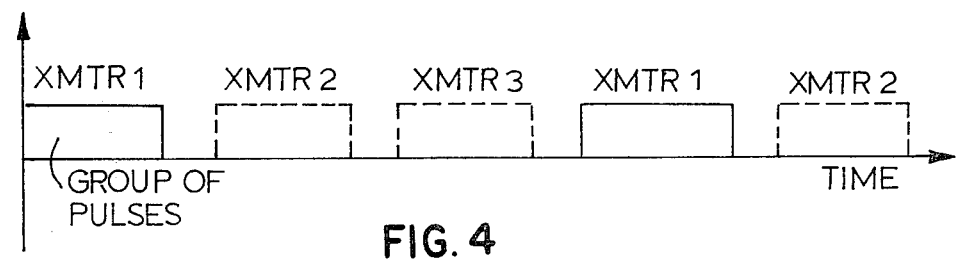
FIG. 4 illustrates the preferred signal format for transmitting the pulses of FIG. 3.

As above stated, the preferred navigation type system of said U.S. Pat. No. 4,151,528, has been selected for the exemplary illustration of the present invention; but it is to be understood that other system pulse shapes may also be used. Similar to the Loran-C system of navigation, each station of the system of FIG. 4 (XMTR 1, XMTR 2 and XMTR 3) transmits groups of pulses in the sequence shown, with each RF pulse of the groups of transmitted pulses having the preferred shape of FIG. 3 for the unambigious cycle selection reasons described in said U.S. Pat. No. 4,151,528, with several half-cycle navigation pulses having a single RF cycle as an intermediate part thereof with either or both of a unique sum amplitude and zero crossing, as shown at the second and third half cycles of the pulses of FIG. 5. The group repetition rate is selected such that it contains time for transmission of the pulse group from each station and sufficient time between each pulse group so that signals from two or more stations cannot overlap in time anywhere in the coverage area, as previously discussed.

Figure 5:
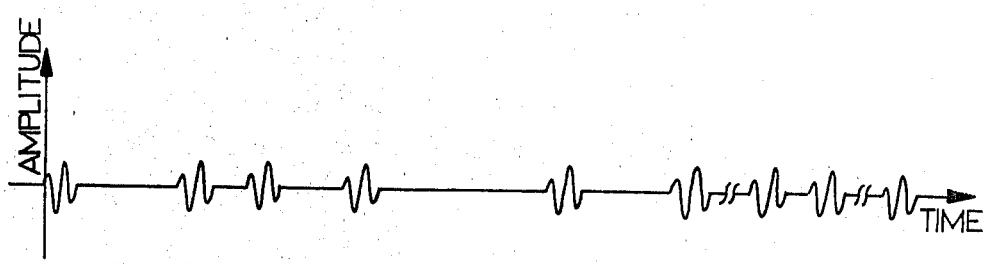
FIGS. 5 and 6 show the random pulse position code within a group; with FIG. 6 showing also random phase modulation.
Figure 6:
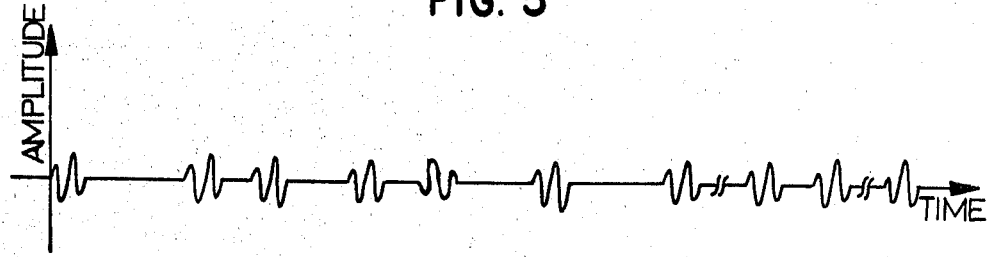

In accordance with the present invention, the pulses within a group are pseudo-randomly position and/or phase modulated as shown in FIGS. 5 and 6. In fact, the modulation may be continued over many groups.

Figure 7:
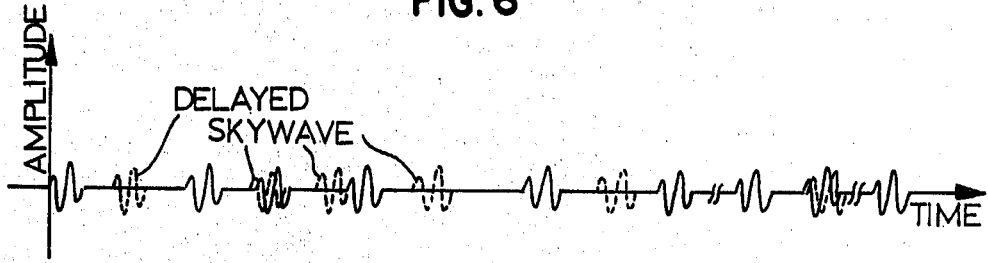
FIG. 7 illustrates the interference caused by a delayed skywave.

Pseudo-random pulse position modulation is the apparently random, but known variation in the time spacing between successive pulses (See FIG. 5). The pseudo-random position modulation insures that only a small percentage of the received pulses suffer skywave interference (see FIG. 7). It also guarantees that the error introduced by the pulses which are interfered with is small. In other words, even though the variance of a location estimate based on the distorted pulses alone is larger, the bias of this estimate is small. Pulse position modulation has the same effect on errors introduced by other interfering signals. It also facilitates signal acquisition, station identification and secure position fixing.

Pulse phase modulation is the apparently random, but known variation of the polarity of the pulses (see FIG. 6). It also controls the bias of position estimates based on pulses suffering skywave or other signal interference. Phase modulation may be used to contribute to system security. It is also useful in signal acquisition and station identification.

A pseudo-random trigger generator initiates the transmission of the pulse, controlling the phase and/or time of the transmission in a pseudo-random manner. Transmitter control circuits 7, FIG. 8, respond to the pseudo-random trigger by providing the signals that the high power section 2 needs to transmit a pulse. They may also analyze the antenna current by feedback 4 to provide control over the temperature-sensitive high power section.

A suitable type of phase-adjusting driving circuit 3 is described, for example, on pages 2-57 through 2-62 of Accufix Instruction Manual, Megapulse Inc., Bedford, Mass., 1973-4. A useful form of trigger generator 5 may be of the type described on pages 60-64 and 85-91 of *Spread Spectrum Systems*, by R. C. Dixon, John Wiley and Sons, 1976; and typical control circuits 7 of the type described on pages 2-82 through 2-101 of said Accufix Instruction Manual may be employed, as may other well-known variants for performing such functions.

The random pulse position code being transmitted in accordance with the invention is also stored in each receiver, with the receiver performing a cross correlation between the received signal and the stored pulse position code as later described in connection with the illustrative receiver of FIG. 9. CW interference present in the received signal is thus sampled in a random way and is therefore transformed to random noise.

The effect of inband CW signals, accordingly, is merely to increase the receiver noise level—with no other malfunctions such as loss of lock or uncorrectable bias errors occurring. In the light of the broad bandwidth of the transmitted signal, furthermore, narrow band notch filters can be used significantly to reduce the effect of CW interference. Conversely, since the energy in the pseudo-random navigation signal of the invention is spread over a wide band and is almost continuous with frequency, the energy density is very low, thereby causing negligible interference with CW or other periodic signals.

The wide bandwidth of the navigation signal of the invention, of course, requires wide bandwidth front-end receivers. At the before-mentioned carrier frequency of 100 kHz, for example, the typical RF front-end bandwidth is 100 kHz, which causes a delay of 1.6 usec. To obtain front-end delay errors of less than 10 nsec, the variation in front end filter component values must only be of the order of 2%, which is quite reasonable and a far cry from the strict tolerances of the prior art, before discussed.

Figure 9:
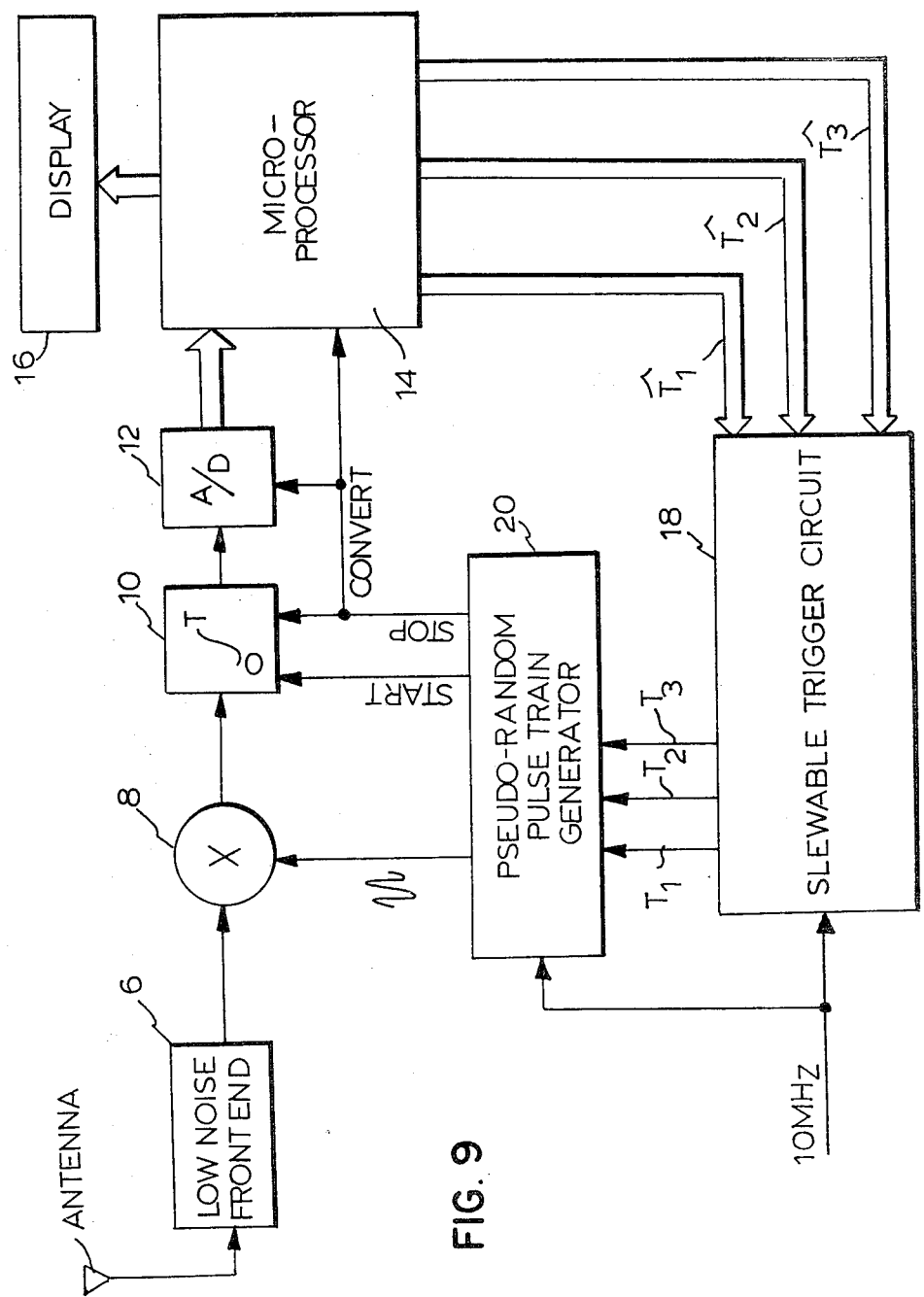
FIGS. 9 and 10 are block diagrams of simple receivers useful in the system of the invention, with FIG. 10 illustrating a non-linear type of receiver.

A block diagram of a suitable linear pseudo-random navigation system receiver is shown in FIG. 9. This receiver identifies the transmitted signals, tracks the phase of these signals and provides time difference information. As before explained, it uses the pseudo-random codes to distinguish the different transmitters to avoid skywave interference and to render in-band interference incoherent.

The received signal flows from the antenna, so-labelled in FIG. 9, to the front end 6. The front end includes a low noise antenna coupler, bandpass filters and appropriate gain stages. It also includes notch filters, which eliminate strong narrow band interference, wherein some of these notches require manual tuning, but others automatically identify and notch interference. The output of the front end 6 is multiplied at 8 be a local version of the desired signal. This product is integrated in the following stage 10, with integration beginning when a local pulse begins, and ending when a local pulse ends. When the local pulse ends, moreover, the output of the integrator is converted to digital form at 12; and finally, the integrator 10 is cleared, as is well-known.

The digitized data is used by a microprocessor 14 to acquire and track all transmitters. While acquiring, the microprocessor 14 searches for a correlation between the local signal and the received signal. It tracks by maintaining a peak output from the integrator 10, using a second order tracking loop to eliminate errors due to vehicle velocity, and statistical algorithms to eliminate data polluted by strong noise. The microprocessor 14 calculates approximate time differences (T1, T2, T3). It also provides outputs to be displayed (especially the time differences) at 16.

Triggers for initiating the internal pulse trains are provided by the slewable trigger circuit 18, with these triggers being slewed in accordance with the microprocessor time difference estimates. This circuit employs a stable clock (say "10 MHZ") as it's basic timing base.

Figure 8:
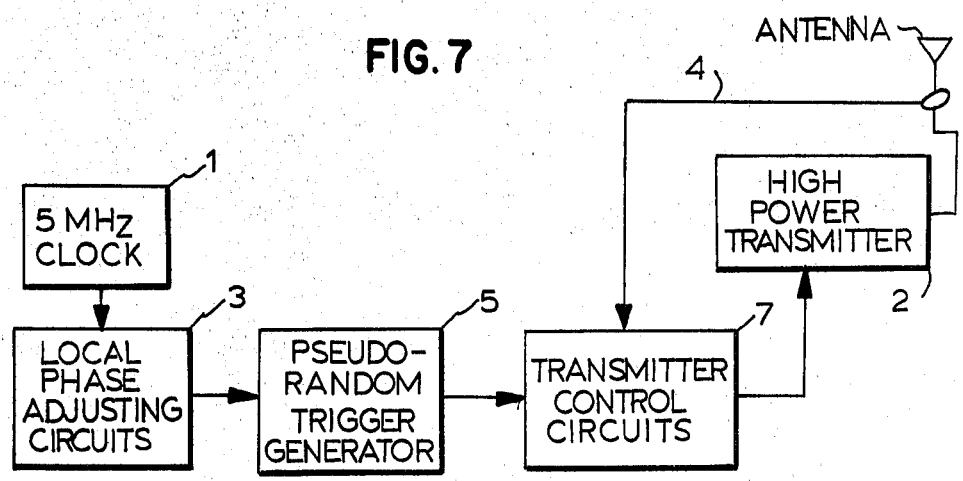
FIG. 8 is a diagram of a circuit suitable for effecting the pseudo-random modulation of the transmitted signals of the invention.

An imitation of the desired signal is provided by a pseudo-random pulse train generator 20, the imitation being analog and modulated by the same pseudo-random code as the transmitted signals of FIG. 8.

Suitable circuits for performing the function of the pseudo-random pulse train generator 20 are described in *Spread Spectrum Systems* by R. C. Dixon (John Wiley and Sons, 1976). A useful microprocessor 14 is, for example, the Motorola 6809. The slewable trigger circuit 18 may be realized using standard TTL-MSI integrated circuits or could be incorporated in the microprocessor. Other well known circuits may also be used to achieve these results.

Figure 10:
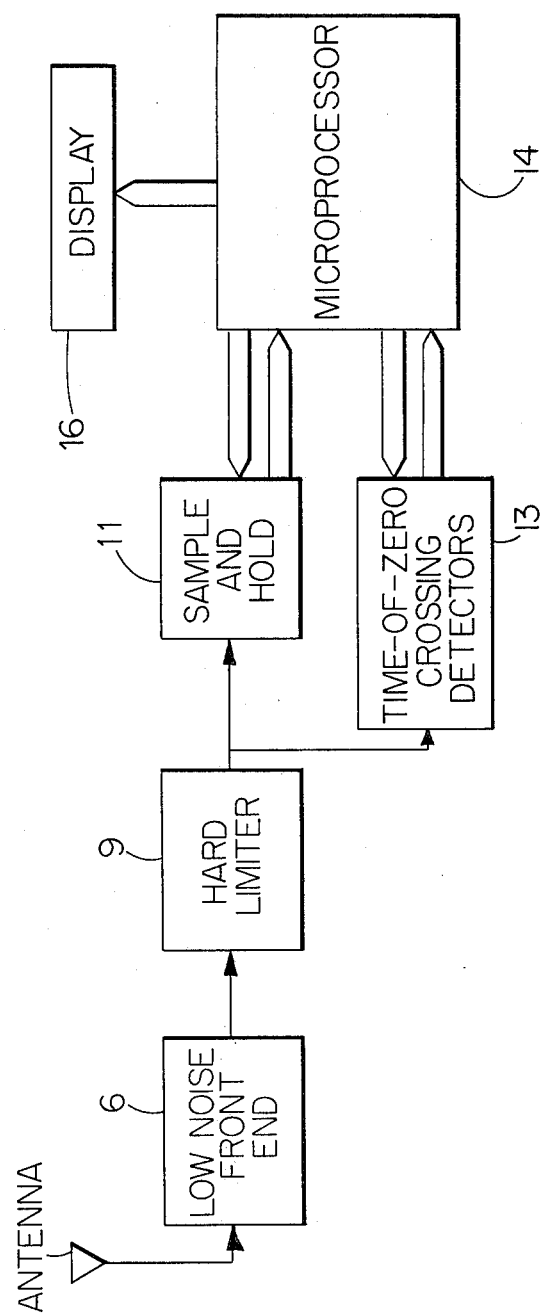

The receiver of FIG. 9, as before mentioned, is a linear-type receiver; but a receiver may also be of the non-linear type, as shown, for example, in FIG. 10. This receiver also uses knowledge of the pseudo-random code to identify and track the transmitted signals. It tracks the phase of these signals and displays time difference and hence position information.

The front end 6 of this receiver is identical to the linear receiver front end of FIG. 9. In this case, however, the front end output is hard-limited at 9. This process retains signal phase information while limiting the signal amplitude. This is done to limit the effect of impulsive noise and to avoid the dynamic range problems inherent in linear designs.

The microprocessor 14 uses knowledge of the pseudo-random codes to acquire the desired signal and track its phase. It acquires by sampling at 11 the hard-limiter output periodically, searching for coherent energy (signal) and performing a modified cross-correlation. It tracks the signal phase by using a plurality of time-of-zero crossing detectors 13 in addition to the sample and holds. The microprocessor phase lock loop is of second order so that errors due to vehicle velocity are eliminated. It also contains statistical algorithms to identify and eliminate data corrupted by strong interference or noise. The microprocessor has algorithms to correct for the drift of its oscillator relative to the transmitter clock.

It outputs the estimated time differences to a display so that the operator can estimate position, all as is well-known in this art.

While the invention has been described in connection with the preferred Loran-C pulses of previously referenced U.S. Pat. No. 4,151,528, the pseudo-random pulsing concept thereof, properly also described as "random" as before discussed, can also be applied to more conventional Loran or other navigation pulses, and to other radio transmitting systems, as well, where similar operational problems may exist; such and other modifications occuring to those skilled in this art being considered to fall within the spirit and scope of the invention as defined in the appended claims.

What is claimed is:

1. A method of rendering multi-station radio-frequency pulse navigation relatively insensitive to inband interference, that comprises, transmitting groups of radio-frequency pulses from each station with a group repetition rate selected to enable transmission of a pulse group from each station with sufficient time between each pulse group that signals from two or more of the stations cannot overlap in time anywhere in the navigation coverage area; pseudo-randomly pulse-position modulating pulses within groups in accordance with a predetermined code and over a sufficiently large number of groups to insure that the resulting pseudo-random pulse sequence contains a sufficiently large number of pulses that adequate skywave-groundwave rejection of the transmitted pulse groups occurs everywhere the same are received in said navigation coverage area.

2. A method as claimed in claim 1 and in which during reception of the transmitted pulses within said navigation coverage area, the received signals are cross-correlated with said predetermined code of pulse-position modulation, transforming any inband interference and the like into random noise.

3. A method as claimed in claim 1 and in which the radio-frequency pulses have the same polarity.

4. A method as claimed in claim 1 and in which the polarity of the radio-frequency pulses is varied to produce simultaneous pseudo-random phase modulation superimposed upon the pseudo-random pulse-position modulation.

5. A method as claimed in claim 1 and in which, during the said pulse-position modulating, pseudo-random phase modulation is superimposed thereupon.

6. A method as claimed in claim 1 and in which the said radio-frequency pulses comprise a single cycle of radio-frequency energy as an intermediate part of a several half-cycle-waveform navigation pulse, the single cycle being unique as to at least one of sum amplitude and zero crossing slope value within the navigation pulse waveform.

7. A method as claimed in claim 2 and in which said reception is effected by identifying the transmitted pulses from said stations, tracking the phase of the same to provide time-difference information, and responding to the said predetermined code of pseudo-random modulation to distinguish the transmissions of the different transmitting stations to avoid skywave interference and to render inband interference incoherent.

8. A method as claimed in claim 7 and in which said reception is linearly effected.

9. A method as claimed in claim 7 and in which said reception is non-linearly effected by limiting the received signals while retaining signal phase information to limit the effect of impulsive noise and to avoid dynamic range limitations, searching for coherent signal information and performing said cross-correlating.

10. A method as claimed in claim 9 and in which the received signal phase is tracked by monitoring time-of-zero crossings.

11. Apparatus for rendering multi-station radio-frequency pulse navigation relatively insensitive to inband interference, that comprises, a plurality of transmitter stations for transmitting groups of radio-frequency pulses from each transmitter station with a group repetition rate selected to enable transmission of a pulse group from each station with sufficient time between each pulse group that signals from two or more of the stations cannot overlap in time anywhere in the navigation coverage area of the plurality of stations; and means for effectively pseudo-randomly pulse-position modulating pulses within pulse groups at said stations in accordance with a predetermined code and over a sufficiently large number of groups to insure that the resulting pseudo-random pulse sequence contains a sufficiently large number of pulses that adequate skywave-groundwave rejection of the transmitted pulse groups occurs everywhere the same are received in said navigation coverage area.

12. Apparatus as claimed in claim 11 and in which receiving means is provided for the reception of the transmitted pulses within said navigation coverage area, said receiving means having means for cross-correlating the received transmissions from said stations with said predetermined code of pulse-position modulation, and means for thereupon transforming any inband interference and the like into random noise.

13. Apparatus as claimed in claim 11 and in which a transmitter station generates radio-frequency pulses of the same polarity.

14. Apparatus as claimed in claim 11 and in which means is provided at a station for varying the polarity of the radio-frequency pulses to produce simultaneous pseudo-random phase modulation superimposed upon the pseudo-random pulse-position modulation.

15. Apparatus as claimed in claim 11 and in which means is provided at a station, operable during the said pulse-position modulating, for introducing pseudo-random phase modulation superimposed thereupon.

16. Apparatus as claimed in claim 11 and in which the transmitter of each said station is provided with means for generating radio-frequency pulses comprising a single cycle of radio-frequency energy as an intermediate part of a several half-cycle-waveform navigation pulse, the single cycle being unique as to at least one of sum amplitude and zero crossing slope value within the navigation pulse waveform.

17. Apparatus as claimed in claim 11 and in which the transmitter at each station comprises a high power transmitter, pseudo-random trigger generator means connected to control the transmitter, and phase-adjusting circuit means connected to the generator means to effect pseudo-random pulse-position modulation of said pulses in accordance with said predetermined code.

18. Apparatus as claimed in claim 12 and in which said receiving means is provided with means for identifying the pulses transmitted from said stations, means for tracking the phase of the same to provide time-difference information, and means for responding to said predetermined code of pseudo-random modulation to distinguish the transmissions of the different transmitting stations to avoid skywave interference and to render inband interference incoherent.

19. Apparatus as claimed in claim 18 and in which said receiving means comprises front-end means connected through frequency multiplier means to integrator means, pseudo-random pulse train generator means connected to said multiplier and integrator means, means for converting the output of said integrator means to digital signals, multiprocessor means connected to receive said digital signals to search for correlation between the received signal and the pseudo-random pulse code and to calculate said time-differences information, and slewable trigger means connected to said generator means and responsive to the time-difference information from said multiprocessor means.

20. Apparatus as claimed in claim 12 and in which said receiving means comprises means for limiting the received signals while retaining signal phase information to limit the effect of impulsive noise and to avoid dynamic range limitations, means for searching for coherent received signal information, and means for thereupon performing said cross-correlating.

21. Apparatus as claimed in claim 12 and in which said receiving means comprises front-end means and limiter means for limiting the received signals while retaining signal phase information, microprocessor means, sample-and-hold circuit means connected periodically to sample the output of the limiting means and for applying the same to the micro-processor means, zero-time crossing detector means connected to said output of the limiting means and to the microprocessor means to enable the same to track the signal phase and perform said cross-correlating.

22. For use with multi-station radio-frequency pulse navigation apparatus adapted to be relatively insensitive to inband interference and wherein groups of radio-frequency pulses are transmitted from each station with a group repetition rate selected to enable transmission of a pulse group from each station with sufficient time between each pulse group that signals from two or more of the stations cannot overlap in time anywhere in the navigation coverage area, and the pulses within said groups are pseudo-randomly pulse-position modulated in accordance with a predetermined code and over a sufficiently large number of groups to insure that the resulting pseudo-random pulse sequence contains a sufficiently large number of pulses that adequate skywave-groundwave rejection of the transmitted pulse groups occurs everywhere the same are received in said navigation coverage area, apparatus for reception of the transmitted pulses within said navigation coverage area comprising, means for receiving the transmitted pulses, means for cross-correlating the received signals with said predetermined code of pulse-position modulation, and means for transforming any inband interference and the like into random noise.

23. Apparatus as claimed in claim 22 and in which said receiving means comprises front-end means connected through frequency multiplier means to integrator means, pseudo-random pulse train generator means connected to said multiplier and integrator means, means for converting the output of said integrator means to digital signals, multiprocessor means connected to receive said digital signals to search for correlation between the received signals and the pseudo-random pulse code and to calculate time-difference information from said stations, and slewable trigger means connected to said generator means and responsive to the time-difference information from said multiprocessor means.

24. Apparatus as claimed in claim 22 and in which said receiving means comprises means for limiting the received signals while retaining signal phase information to limit the effect of impulsive noise, means for searching for coherent received signal information, and means for thereupon performing said cross-correlating.

25. Apparatus as claimed in claim 22 and in which said receiving means comprises front-end means and limiter means for limiting the received signals while retaining signal phase information, microprocessor means, sample-and-hold circuit means connected periodically to the output of the limiting means and for applying the same to the microprocessor means, zero-time crossing detector means connected to said output of the limiting means and to the microprocessor means to enable the same to track the signal phase and perform said cross-correlating.

26. Apparatus as claimed in claim 22 and in which said receiving means comprises means for identifying the transmitted pulses from said stations, means for tracking the phase of the same to provide time-difference information, and means for responding to the said predetermined code of pseudo-random modulation to distinguish the transmissions of the different transmitting stations while avoiding skywave interference and rendering inband interference incoherent.

27. For use with multi-station radio-frequency pulse apparatus adapted to be relatively insensitive to inband interference and wherein groups of radio-frequency pulses are transmitted from each station with a group repetition rate selected to enable transmission of a pulse group from each station with sufficient time between each pulse group that signals from two or more of the stations cannot overlap in time anywhere in the navigation coverage area, and the pulses within said groups are pseudo-randomly pulse-position modulated in accordance with a predetermined code and over a sufficiently large number of groups to insure that the resulting pseudo-random pulse sequence contains a sufficiently large number of pulses that adequate skywave-groundwave rejection of the transmitted pulse groups occurs everywhere the same are received in said navigation coverage area, a method of reception of the transmitted pulses within said navigation coverage area comprising, receiving said transmitted pulses, cross-correlating the received signals with said predetermined code of pulse-position modulation, and transforming any inband interference and the like into random noise.

28. A method of rendering radio-frequency pulse transmissions relatively insensitive to inband interference, that comprises, transmitting groups of radio-frequency pulses with group repetition rates selected with sufficient time between each group that signals cannot overlap in time anywhere in the desired coverage area; pseudo-randomly pulse-position modulating pulses within groups in accordance with a predetermined code and over a sufficiently large number of groups to insure that the resulting pseudo-random pulse sequence contains a sufficiently large number of pulses that adequate skywave-groundwave rejection of the transmitted pulse groups occurs everywhere the same are received in said coverage area.

29. A method as claimed in claim 28 and in which during reception of the transmitted pulses within said coverage area, the received signals are cross-correlated with said predetermined code of pulse-position modulation, transforming any inband interference and the like into random noise.

* * * * *